United States Patent [19]

Arnold et al.

[11] 3,998,744
[45] Dec. 21, 1976

[54] OIL FRACTURING SPACING AGENTS

[75] Inventors: Vernon W. Arnold, Naperville;
Robert J. Lee, Dolton, both of Ill.

[73] Assignee: Standard Oil Company
Chicago, Ill.

[22] Filed: Apr. 16, 1975

[21] Appl. No.: 568,598

[52] U.S. Cl. .............................. 252/8.55 R; 166/280
[51] Int. Cl.$^2$ ........................................ E21B 43/26
[58] Field of Search ........ 252/8.55 R, 8.5 L, 8.5 C;
166/280

[56] References Cited

UNITED STATES PATENTS

| | | | |
|---|---|---|---|
| 3,149,673 | 9/1964 | Pennington | 252/8.55 X |
| 3,195,635 | 7/1965 | Fast | 252/8.55 X |
| 3,677,941 | 7/1972 | Mazzara et al. | 252/8.55 |
| 3,684,761 | 8/1972 | Stampa | 260/33.2 |

OTHER PUBLICATIONS

Stempel et al., Article in Journal of the American Chemical Society, vol. 73, Jan. 1951, pp. 455 and 456.

*Primary Examiner*—Herbert B. Guynn
*Attorney, Agent, or Firm*—Wallace L. Oliver; Arthur G. Gilkes; William T. McClain

[57] ABSTRACT

Oil-soluble spacing agents for use in fracturing underground oil or gas formations comprising polymerized dimethyl-alpha-methylstyrenes.

6 Claims, No Drawings

OIL FRACTURING SPACING AGENTS

BACKGROUND OF THE INVENTION

This invention relates to non-oxidizable oil-soluble spacing agents useful in fracturing underground oil or gas formations which increases production of oil or gas therefrom.

In the Hydrofrac Process, described in U.S. Pat. No. Re. 23,733 and U.S. Pat. No. 3,217,801, both incorporated herein by reference, a slurry of propping particles containing such materials as walnut shells, glass beads or the like is injected through a well-hole into an oil or gas bearing geologic strata such that the formation is fractured and the particles deposited within the fractured layers. After such treatment, the oil- or gas-bearing strata becomes more porous, allowing a greater percentage recovery of the oil or gas in formation. A problem in this process is encountered after a slurry of only oil-insoluble propping particles is injected. In this situation the particles can agglomerate and effectively plug the fractured cracks in the strata resulting in a formation which is not as porous as it would be if the propping were spaced about the cracks. One solution to this problem is disclosed in U.S. Pat. No. 3,677,941, which is incorporated herein by reference, whereby essentially spherical beads of oil-soluble resin are mixed with the oil-insoluble propping particles. When injected into the formation, the oil-soluble beads will act as spacing agents for the propping particles such that when hydraulic pressure is released and an overburden load reimposed after fracturing and after petroleum is resumed, the spacing agents will be dissolved by the petroleum, leaving the propping particles randomly spaced within the fractured strata. The net result is that oil-bearing strata become more porous and thus the recoverable amount of petroleum within the strata is increased.

As disclosed by prior art, resins suitable for use in spacing agents must be crude-oil soluble and capable of being prilled into deformable, substantially spherical shapes. Further, the prilled resins must be strong enough to remain intact during use and must be sufficiently chemically stable to resist degradation, including oxidation, during manufacture and storage. In order to overcome the degradation problem, the prior art spacing resins, described in U.S. Pat. No. 3,677,941, require an antioxidant.

It is the object of our invention to produce a resin suitable for use as a spacing agent in the Hydrofrac Process which resists degradation without antioxidants. Another object of our invention is to produce deformable spacing agents which have better physical properties than those previously described. Other objects appear hereafter.

SUMMARY OF THE INVENTION

We have discovered spacing agents for use in the Hydrofrac Process which need no added antioxidant and which have better physical properties than agents known to the art.

The spacing agents of our invention are substantially spherical deformable oil-soluble resin spacing particles having a softening point within the ranges 200° to 325° F. (93° to 163° C.) and a mesh size between 4 and 20 mesh, said resin comprising oil-soluble polymers of dimethyl-alpha-methylstyrene.

DESCRIPTION OF THE INVENTION

We have found that deformable, substantially spherical shapes of 4 to 20 mesh (measured by the U.S. standard sieve screens), which can be formed by prilling polymers of dimethyl-alpha-methylstyrene are superior oil-soluble spacing agents. The resins useful in our invention include polymers of 3,4-dimethyl-alpha-methylstyrene, 2,3-dimethyl-alpha-methylstyrene, 2,5-dimethyl-alpha-methylstyrene, 2,4-dimethyl-alpha-methylstyrene and 3,5-dimethyl-alpha-methylstyrene. Of the various dimethyl-alpha-methylstyrene monomers we prefer 3,4-dimethyl-alpha-methylstyrene which can be made in high yield using a synthetic route that alkylates o-xylene with propylene followed by dehydrogenation. Since it is more difficult to dehydrogenate a isopropyl group which is adjacent to a methyl group, isomers which contain such a configuration are less preferred.

The monomers, dimethyl-alpha-methylstyrenes, are known to the art and an example of their preparation is described by Mamedaliev, et al. in Dokl. Akad. Nauk Azerbaidzhan. SSR, 19, 13 (1963). Generally, these monomers are synthesized by dehydrating a propylene-alkylated xylene. Both the dehydration and alkylation processes use catalysts and methods well known in the art. The monomer, 3,4-dimethyl-alpha-methylstyrene also is described by Stempel et al. in J. Amer. Chem. Soc., 73, 455 (1951).

Dimethyl-alpha-methylstyrene can be polymerized by either using an anionic catalyst as described in U.S. Pat. No. 3,684,761 or a boron trifluoride ($BF_3$) catalyst. In our method, dimethyl-alpha-methylstyrene, such as the 3,4-dimethyl species or mixtures containing such species, is diluted with 1,2,4-dimethylisopropylbenzene (or toluene or other aromatic) to give a polymerization feedstock containing about 20% of the dimethyl-alpha-methylstyrene monomers. This feedstock, dried to a water content of 35–100 ppm, is pumped through a cooling coil and cooled to a temperature of −20° to −50° F. (−29° to −45.5° C.), and then mixed with 0.1 to 0.5 weight percent of boron trifluoride catalyst in a tubular reactor which provides turbulence and about a 1-minute residence time. Virtually complete conversion of the monomer to resin occurs under these conditions. Higher softening point resin is produced at the lower polymerization temperatures and is largely independent of the catalyst concentration. The effluent from the polymerization reactor is distilled to remove the $BF_3$ and aromatic diluent, and stripped to yield the resin product of low volatiles content.

Properties of a series of 3,4-dimethyl-alpha-methylstyrene polymers formed using this process are shown in TABLE I. The polymerizations were run in a continuous manner through a tubular adiabatic reactor providing 20 seconds residence time, and using gaseous $BF_3$ catalyst at a concentration of 0.4 wt.% based on dimethyl-alpha-methylstyrene (or 0.08% $BF_3$ on total feed) in all runs except Run 3 in which $BF_3$ concentration was about 0.6 wt.%. The diluent was isopropyl-o-xylene (b.p. 190°–205° C.) in all runs except Run 11 where the monomer was diluted with 60% toluene.

TABLE I

| Run No. | Concentration of Monomer in Feed (Wt.%) | Reactor Inlet Temp. (° F.) | ASTM: E28-51T Softening Point (F °) | 60% Solution in Toluene ||| Mol. Wt. | Density (g/ml) (24° C.) |
|---|---|---|---|---|---|---|---|---|
| | | | | Color | Gardner Viscosity | Viscosity (100° F.) (SSU) | | |
| 1 | 22.5 | −30 | 207 | 2 | A | 154 | 600 | — |
| 2 | 22.9 | −44 | 225 | 2 | C | 225 | 671 | — |
| 3 | 20 | −44 | 265 | 3 | H | 444 | 862 | — |
| 4 | 20 | −36 | 246 | 2 | F | 339 | 768 | 1.025 |
| 5 | 20 | −42 | 268 | 2 | I | 563 | 891 | — |
| 6 | 20 | −36 | 275 | 6 | N | 687 | 862 | — |
| 7 | 20 | −36 | 274 | 1 | M | 681 | 923 | — |
| 8 | 20 | −36 | 269 | 1 | L | 596 | 888 | — |
| 9 | 20 | −36 | 247 | 1 | F | 389 | — | — |
| 10 | 20 | −42 | 242 | 3 | G | 358 | — | — |
| 11 | 20 | −42 | 263 | 3 | I | — | — | — |

The substantially spherical particles of our invention can be produced by prilling the poly(dimethyl-alpha methylstyrene) resin using methods described in U.S. Pat. No. 3,677,941.

In order to be useful, the spacing particles must be oil soluble. By oil soluble we mean that 1 gram of resin readily will dissolve in 100 milliliters of kerosene at 25° C. without leaving any detectable insoluble residue. Particularly, a useful spacing particle must completely dissolve in crude oil at temperatures encountered in an oil-bearing formation. We have found that prills of dimethyl-alpha-methylstyrene resins with softening points between about 200° and 325° F. (93°–163° C.) are completely soluble in kerosene, crude oil, n-hexane and n-heptane at resin concentrations of at least 10%. By comparison, unsubstituted poly(alpha-methylstyrene) is almost completely insoluble, while poly(monomethyl-alpha-methylstyrenes) (methyl meta/para ratio of 65/35) are not completely soluble in these solvents, although the monomethyl-alpha-methylstyrene resins do have much better solubility than the unsubstituted polymers. Even among the dimethyl resins there is a difference in solubility. We have found that homopolymers of 3,4-dimethyl-alpha-methylstyrene are completely oil soluble and surprisingly have better solubility characteristics than homopolymers of 3,5-dimethyl-alpha-methylstyrene which do not completely dissolve in kerosene or n-hexane. However, it is possible to produce copolymers of 3,4- and 3,5-dimethyl-alpha-methylstyrene which are completely oil soluble. Considering both solubility characteristics and ease of monomers preparation, resins primarily comprising polymers of 3,4-dimethyl-alpha-methylstyrene are the materials of choice for the production of spacing agents.

The spacing agents of our invention show several advantages over the prior art particles which are described in U.S. Pat. No. 3,677,941. First, the resins of our invention have excellent oxidation resistance and practically indefinite storage stability at elevated temperatures, a fact which is especially important when an oil-producing area is in a hot climate.

Secondly, the polymers of our invention can be produced easily with softening points of 245° to 325° F. (118° to 163° C.) which are generally higher than those for spacing particles commercially available (e.g., Amoco Resin 506). This property is important since it is difficult to prill low softening point resins because hot, soft prills tend to stick together. Even more important is the tendency of low softening point resins to stick together or form a solid mass ("blocking") in high temperature (e.g., 125°–150° F. (52°–66° C.)) field storage conditions. The resins of our invention are easy to prill and there are no problems with sticking or "blocking."

Thirdly, the resin of our invention is relatively strong and durable, and thus resists breaking up in screening and sizing operations or in the course of being pumped into a well. The resin of our invention has good strength and resistance to abrasive action as is shown in TABLE II.

TABLE II

| | softening point[1] ° F.(° C) | weight (g.) required to crush a single 12-mesh prill |
|---|---|---|
| Amoco Resin 506[2] | 235 (113) | 200 |
| poly(3,4-dimethyl-alpha-methylstyrene) | 246 (119) | 400–500 |
| | 275 (135) | 500 |
| poly(alpha-methylstyrene)[3] | 290 (143) | 900–1200 |

[1]ASTM E28-51T
[2]a resin based upon U.S. Patent 3,677,941
[3]oil insoluble

In practice, the spacing particles of our invention are mixed with oil-insoluble propping particles in liquid (such as water) to form a fracturing fluid and then the fluid is pumped through a well-hole into an oil-bearing formation. Thus, a slurry is formed as described in U.S. Pat. No. 3,217,801 in effective proportions including the oil-soluble spacing particles in a bulk volume ratio of spacing particles to propping particles of about 2:1 to 20:1 and frequently in the range of 3:1 to 10:1.

EXAMPLE I

Samples of poly(3,4-dimethyl-alpha-methylstyrene) with a softening point of 246° F. were placed in an oven at 150°±5° F. for 12 and 27 days. These samples and an unheat-treated sample were placed in filtered Second Wall Creek crude oil from the Salt Creek Wyoming field. The untreated sample was soluble at least up to 1.5% while the sample heated for 12 days was soluble when tested at 1.3% concentration and the 27 day sample was soluble at 1.5% concentration. No insoluble products were formed and no sticking of the resin particles occurred as a result of these long-term high-temperature storage conditions.

ILLUSTRATIVE EMBODIMENT

As described in the prior art, the precise composition of a fracturing fluid depends upon the specific characteristics of the petroleum production site involved. The precise composition of the fracturing fluid and method of use required in a specific situation are within the skill of the art. The following is given as an illustration of the use of our invention:

In a complete oil well in the McLish sand formation in Oklahoma, fracturing can be performed at a depth of about 7,750 feet by first injecting 20–40 mesh sand into the formation followed by a water slurry containing three pounds of 12–20 mesh resin spacing particles per pound of 12–20 mesh substantially spherical black walnut shells. The resin spacing particles are obtained by prilling polymers of 3,4-dimethyl-alpha-methylstyrene with a softening temperature of 275° F. and screening the particles to separate those between 12 to 20 mesh range. The initial production from such a treated well normally will be as much as 2½ times that of an untreated well.

Our invention is an improvement in the Hydrofrac Process whereby an oil-soluble non-oxidizable spacing particle is employed and which should lead to greater petroleum production at a lower economic cost.

We claim:

1. Substantially spherical deformable oil-soluble resin spacing particles having a softening point within the range 200° to 325° F. and a mesh size between 4 to 20 mesh, said resin selected from the group consisting of oil-soluble homopolymers of 3, 4, dimethyl alpha methyl styrene and oil soluble copolymers wherein the monomer units are 3, 4, dimethyl alpha methyl styrene and 3, 5 dimethyl alpha methyl styrene.

2. The spacing particles of claim 1 where the resin constitutes homopolymers of 3,4-dimethyl-alpha-methylstyrene.

3. The spacing particles of claim 2 having a softening point within the range 245° to 325° F.

4. In a process for fracturing a formation penetrated by a well, whereby a slurry of propping and oil-soluble spacing particles are injected under pressure through a well-hole into an oil- or gas-bearing geologic strata, the improvement which comprises including within a fracturing fluid effective proportions of substantially spherical deformable oil-soluble resin spacing particles having a softening point within the range 200°–320° F and a mesh size between 4 and 20 mesh, said resin selected from the group consisting of oil-soluble homopolymers of 3, 4, dimethyl alpha methyl styrene and oil soluble copolymers wherein the monomer units are 3, 4, dimethyl alpha methyl styrene and 3, 5 dimethyl alpha methyl styrene.

5. The process of claim 4 where the resin constitutes homopolymers of 3,4-dimethyl-alpha-methylstyrene.

6. The process of claim 5 in which the spacing particles have a softening point within the range 245° to 325° F.

* * * * *